United States Patent Office 3,541,366
Patented Nov. 17, 1970

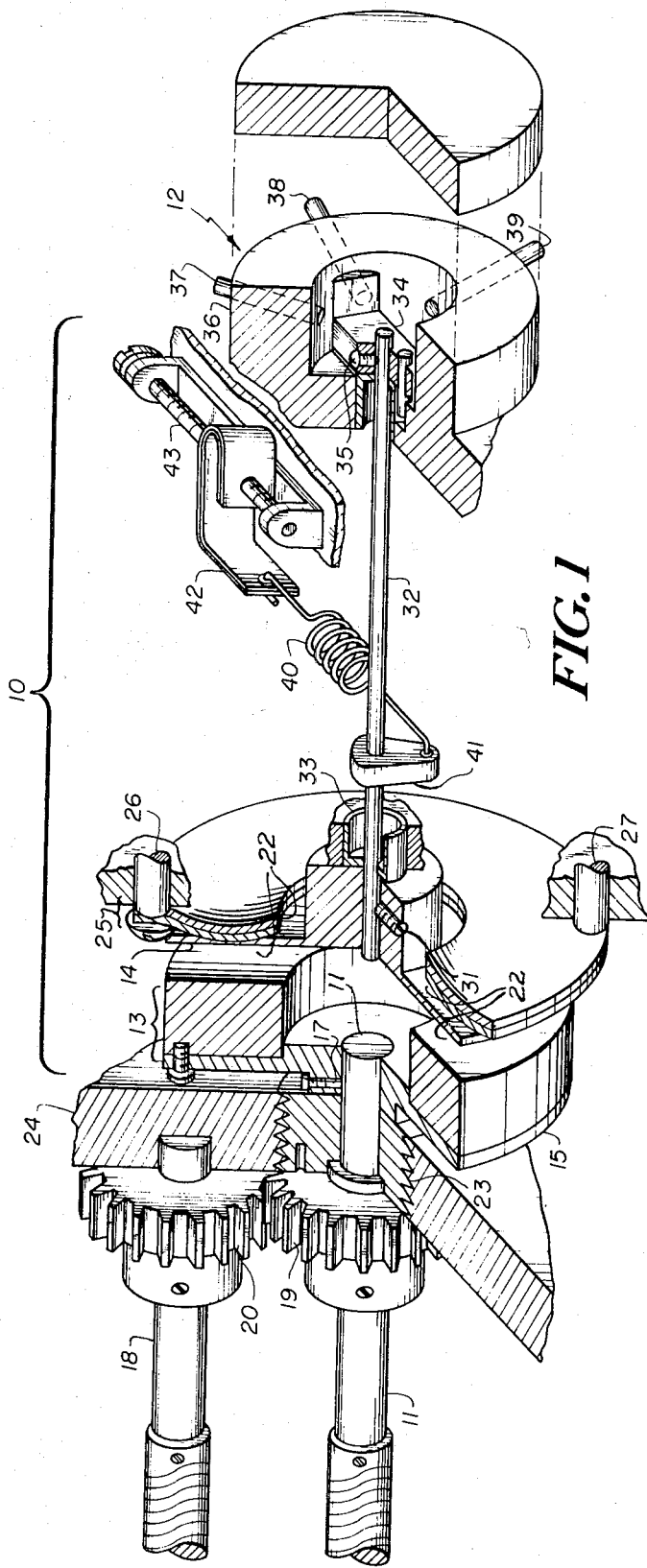
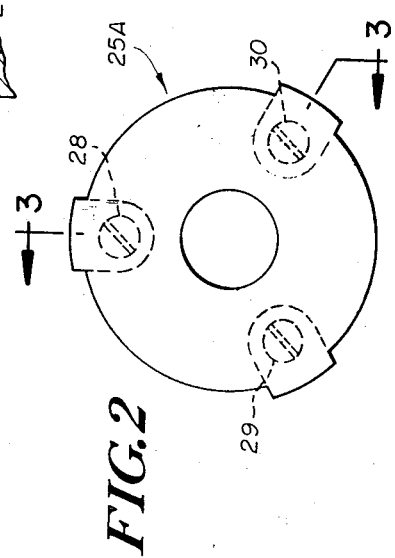
FIG.1
FIG.2
FIG.3
INVENTORS
DONALD J. BAXTER
ROBERT L. DANGLER
WILLIAM E. HANRAHAN
BY
ATTORNEY

3,541,366
TEMPERATURE COMPENSATED ELECTRO-MAGNETIC COUPLING
Donald J. Baxter, South Euclid, Robert L. Dangler, Shaker Heights, and William E. Hanrahan, Mentor, Ohio, assignors to The Marquette Metal Products Company, a corporation of Ohio
Original application Sept. 14, 1967, Ser. No. 667,756. Divided and this application Apr. 24, 1969, Ser. No. 819,037
Int. Cl. H02k 49/04
U.S. Cl. 310—97       4 Claims

ABSTRACT OF THE DISCLOSURE

In an electromagnetic coupling having an output member which is subjected to a torque force induced by a rotating magnetic disc assembly, a temperature responsive means is provided to automatically coact with the magnetic disc assembly to provide for magnetically induced torque forces on the output member which are substantially independent of changes in temperature.

---

This invention relates to electromagnetic couplings and, more particularly, to an electromagnetic coupling wherein rotary movement is transmitted to an output member upon a predetermined angular velocity of an input member.

The present application is a divisional application of applicants' pending U.S. patent application, Ser. No. 667,756, filed Sept. 14, 1967, for a governing system for engines and automotive vehicles.

BACKGROUND OF INVENTION

In electromagnetic couplings of the type disclosed in the U.S. patent to Day, No. 3,340,952, means, such as a spring, is provided to impose a torque force on the output element of the apparatus which torque force determines the point at which rotary movement of the output member will occur. In such couplings it has been found that the point at which rotary movement occurs varies because the magnitude of the biasing torque force varies with temperature changes which cause an alteration in the strength of the magnetic field.

Accordingly, it is an object of the present invention to provide an improved electromagnetic coupling which is more accurate than heretofore known eletromagnetic couplings. Another object of this invention is to provide an improved electromagnetic coupling which automatically compensates for changes in temperature.

A feature of the present invention is the provision in an electromagnetic coupling of means responsive to changes in temperature to maintain the magnetic flux acting upon the output member of the assembly substantially unaffected by temperature changes.

Another feature of this invention is the provision of means for automatically adjusting the torque biasing means to compensate for temperature changes not fully compensated for by the first mentioned temperature responsive means to insure that magnetic flux acting on the output member remains substantially independent of changes in temperature.

SUMMARY OF THE INVENTION

Accordingly, the present invention provides, in an electromagnetic coupling of the type having a rotatable magnetic input member, such as a disc magnet, disposed in close, spaced relationship to a rotatably mounted output member of magnetically conductive material to subject the output member to a magnetic torque force which varies proportionately to the angular velocity of the input member, means for altering the magnetic flux or eddy currents acting upon the output member automatically in accordance with temperature changes to maintain the magnetic flux induced in the output member to remain substantially constant for any particular operating condition. Also, the present invention contemplates a biasing means for applying a torque force on the output member directed counter to the torque induced in the output member by the magnetic flux, which means automatically adjusts to temperature changes so as to compensate for change in magnetic flux not compensated by the first mentioned means.

BRIEF DESCRIPTION OF THE DRAWINGS

The invention will be more fully understood from the following description when considered in connection with the accompanying drawings in which:

FIG. 1 is a perspective view, somewhat schematic, of an electromagnetic coupling according to this invention connected to operate a valve which may form part of an engine or vehicle speed control system;

FIG. 2 is an end elevational view of a modified fixed disc forming part of the electromagnetic coupling; and FIG. 3 is a cross-sectional view taken substantially along line 3—3 of FIG. 2.

DETAILED DESCRIPTION

Now referring to the drawings and more particularly to FIG. 1, numeral 10 represents an eddy current drag coupling or electromagnetic coupling according to this invention connected at one end to an input shaft 11, such as a transmission cable, and at the opposite end to a member to be actuated, such as a rotary servo valve 12. The electromagnetic coupling 10 while herein described and shown as applied to an engine or vehicle speed control system such as fully disclosed in the aforementioned parent application and the patent to Day, No. 3,340,952, such disclosure is only for purposes of illustration and it is to be understood that the invention is not limited to such application. The electromagnetic coupling 10 is applicable to a wide variety of apparatuses and mechanisms which are subject to ambient temperature changes and wherein accuracy of operation is desirable. The electromagnetic coupling 10, as shown in FIG. 1, includes an input member or disc magnet assembly 13 which, upon rotation relative to an output member or field disc 14, acts on the field disc 14 with a torque that is a measure of the speed of rotation of the input member. The input member 13 is a disc magnet assembly of a well known type having a plurality of permanently magnetized portions that form magnetic poles at the end faces thereof. The disc magnet assembly 13 is secured to plate 15. Plate 15 is affixed, as by set screw 17, to input shaft 11 which rotates proportionately to vehicle or engine speed. The shaft 11 may be connected with the speedometer or other gage by way of a cable 18 of the vehicle through meshing gears 19 and 20. The electromagnetic coupling 10 also includes field disc 14 which is of electrically conductive material, such as copper. The field disc 14 is axially spaced from magnet assembly 13 in an air gap 22 and can be adjusted during assembly as required for proper operation of the coupling by means of set screw 31 in the hub portion of the field disc. Also, assembly adjustment of the size of air gap 22 can be achieved by the positioning of screw 23 in fixed support structure 24.

Rotation of disc magnet assembly 13 results in a torque on field disc 14 in the direction of rotation of the disc magnet due to eddy currents induced in the disc, as lines of flux from the disc magnet cut across the disc, and the resulting reaction between the currents in the disc and magnetic flux producing them. An increase in the speed of rotation of the disc magnet results in an increased torque on field disc 14 and a decrease in the speed of rotation of the disc magnet causes torque on the field disc 14 to decrease. In accordance with the present invention a bimetallic member 25 containing magnetically permeable material is provided adjacent field disc 14. The bimetallic member 25 may be formed as shown in FIG. 1 in which case it is secured to a fixed structure at two points, as by screws 26 and 27, to permit bowing, as indicated, within gap 22 toward field disc 14 when subjected to increased temperatures. Alternately, the bimetallic member 25 may be formed as shown in FIGS. 2 and 3 (wherein it is designated by reference character 25A), in which embodiment it may be secured to a fixed structure at three or more points, as by screws 28, 29 and 30. The bimetallic member 25 is constructed and assembled in the electromagnetic coupling 10 to bow or deform in a direction toward disc magnet assembly 13 to reduce the size of gap 22 upon an increase in temperature and cause more of the lines of flux to cut across the field disc 14 and thereby compensate for loss in or weakening of the magnetic field of disc magnet assembly 13 due to the temperature increase.

The field disc 14 is affixed by a set screw 31 to an output shaft 32 which is rotatably mounted in bearing 33. A movable valve member 34 of the servo valve 12 is also affixed to output shaft 32 by set screw 35 and such valve member is positionable by the shaft in servo valve housing 36 to thereby control fluid flow through ports 37, 38 and 39 of the servo valve. The valve member 34 connects, through shaft 32, with a biasing spring 40 which exerts a torque on the shaft in a direction opposite to the direction of rotation of disc magnet assembly 13. As shown, one end of spring 40 connects with an arm 41 on shaft 32 and the other end connects in acordance with this invention, with a bimetallic temperature compensating bracket 42 which can be adjusted by screw 43 to set tension in spring 40. The bimetallic bracket 42 is constructed to reduce tension in spring 40 upon an increase in temperature and in this way to compensate for losses in the magnetic field of disc magnet assembly 13 not compensated for by the adjacent bimetallic member 25 (FIG. 1) or 25A (FIGS. 2 and 3). By means of the bimetallic member 25 or 25A and the bimetallic bracket 42, substantially all changes in magnetic flux due to temperature changes which, in a speed governor system, may result from operation of the engine of the vehicle in which the governor system is installed, is compensated for so that the torque exerted on shaft 32 is rendered independent of temperature variations.

It is believed now readily apparent that the present invention provides an improved eddy current drag coupling or electromagnetic coupling which is more accurate than heretofore known couplings since the torque imposed on the output member thereof is substantially independent of changes in temperature conditions.

Although only two embodiments of the invention have been illustrated and described in detail, it is to be expressly understood that the invention is not limited thereto. Various changes can be made in the arrangement of parts without departure from the spirit and scope of this invention as the same will be now understood by those skilled in the art.

What is claimed is:

1. Mechanism for generating a speed responsive signal comprising an eddy current coupling including a rotatable input member having a plurality of magnetic poles and a rotatable output member of electrically conductive material, a shaft to provide an output signal connected to the output member of the coupling for rotation thereby, a fixed structure and a bimetallic member containing magnetically permeable material mounted on the fixed structure adjacent the output member and oriented to deform toward and away from the output member to thereby compensate for changes in the magnetic field of the input member as ambient temperature varies.

2. Mechanism for generating a speed responsive signal as defined in claim 1 wherein the bimetallic member is a disc connected with the fixed structure at no more than three locations around the peripheral margin.

3. The apparatus of claim 1 wherein a biasing means is connected to the shaft to impose on the latter a torque force of a predetermined value counter to the magnetically induced torque force and wherein said biasing means includes a temperature responsive support means to adjust the biasing force to also compensate for changes in the magnetic field of the input member caused by temperature changes.

4. Mechanism for generating a speed responsive signal as defined in claim 1 including a spring connected to the shaft for exerting a torque thereon tending to move the shaft in a direction opposite to the torque exerted by the eddy current coupling and means for adjusting tension in the spring including a bimetallic member deformable to reduce spring tension upon an increase in temperature and thereby also compensate for losses in the magnetic field of the input member.

References Cited

UNITED STATES PATENTS

| | | | |
|---|---|---|---|
| 1,181,186 | 5/1916 | Thompson | 73—520 |
| 2,851,621 | 9/1958 | Fauvelot | 310—97 |

DAVID X. SLINEY, Primary Examiner

U.S. Cl. X.R.

310—105